Patented May 7, 1929.

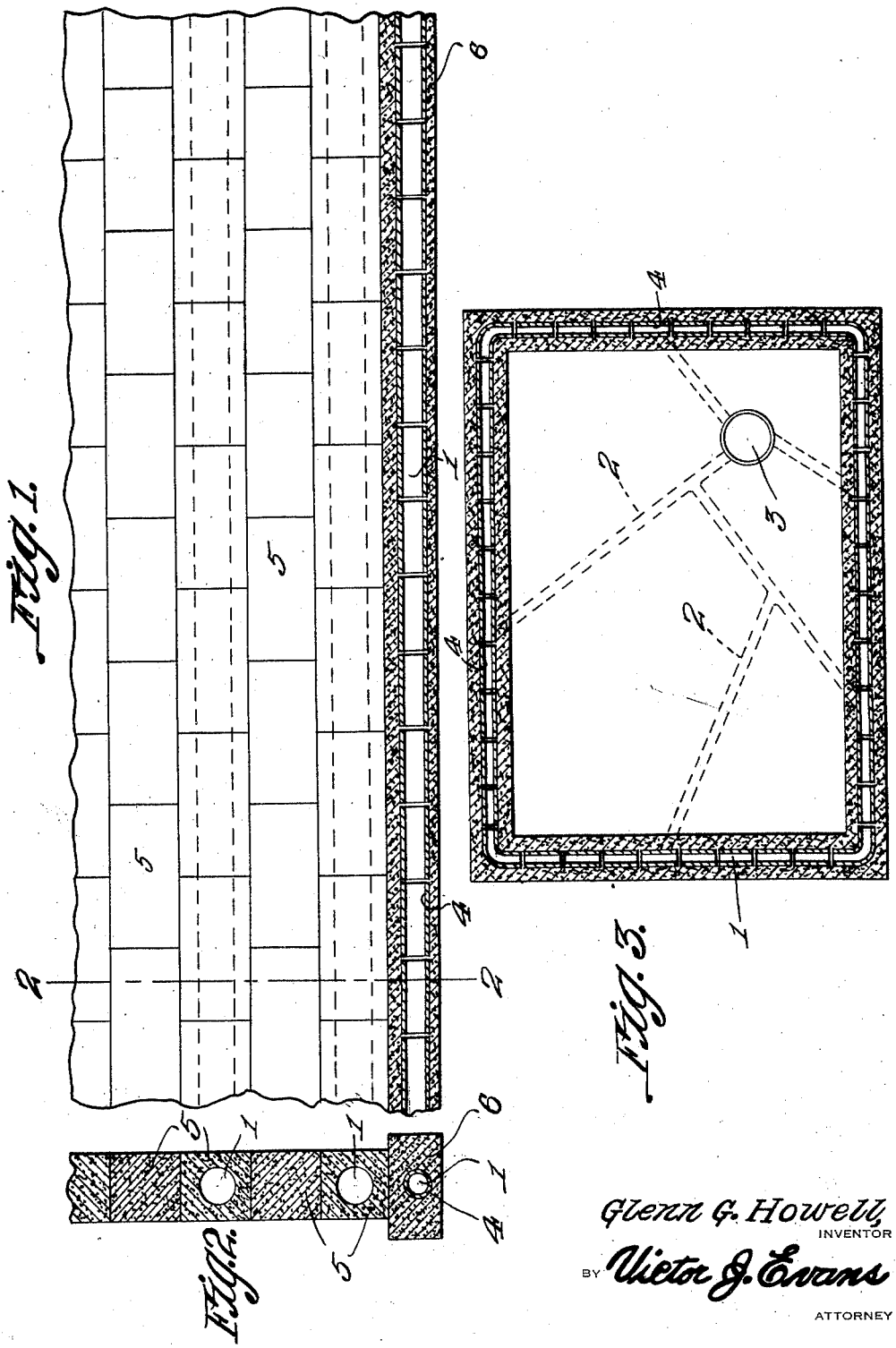

1,712,303

UNITED STATES PATENT OFFICE.

GLENN G. HOWELL, OF COLUMBUS, OHIO.

DRAINAGE SYSTEM.

Application filed January 23, 1926. Serial No. 83,315.

This invention relates to a drainage system for buildings, the general object of the invention being to provide means for preventing water from collecting in the basement of the building and under the foundation base.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation, partly in section, of a wall of a building.

Figure 2 is a section on line 2—2 of Figure 1.

Figure 3 is a horizontal sectional view through the basement of the building.

As shown in these views, I form horizontally extending passages 1 in the walls of the basement of a building so that water seeping through the walls will drain into these passages and pass along the same to the drain passages 2 arranged in the basement floor and which are connected with the sewer 3 or other drainage outlet. I prefer to form these passages by placing tiles 4 in the blocks 5 which compose the walls of the building. I place one of the passages 1 in the base 6 of the building so that the water cannot collect around and under the base which might weaken the building by permitting the walls to sink in the softened ground under the base.

These passages prevent the water seeping through the walls into the basement and from collecting outside the walls and under the same and they also permit the circulation of air which tends to dry the walls quickly. By placing the passages in the walls, there is no danger of them becoming clogged up as no foreign matter can enter them with the water, as the water is filtered by its passage through the pores of the blocks.

It will, of course, be understood that the tiles can be placed in the walls, as the walls are being poured or the tiles can be placed in the blocks as the blocks are manufactured and such blocks used in the building of the walls. In this way, the drainage system is anchored in the wall itself and there is no danger of it getting out of order.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A building having the walls of its basement formed of porous material with horizontal passages in said walls into which the water and air passing through the porous material will collect, tiles in the passage in the base of the wall having their ends spaced apart and means for conducting the water collecting in the passages to a drain.

In testimony whereof I affix my signature.

GLENN G. HOWELL.